United States Patent [19]

Haldemann

[11] Patent Number: 5,777,417
[45] Date of Patent: Jul. 7, 1998

[54] TRANSPOSED STATOR WINDING BAR WITH EXTENDED FIELD COMPENSATION

[75] Inventor: Johann Haldemann, Birr, Switzerland

[73] Assignee: Asea Brown Boveri AG, Baden, Switzerland

[21] Appl. No.: 748,784

[22] Filed: Nov. 14, 1996

[30] Foreign Application Priority Data

Dec. 5, 1995 [DE] Germany .................. 195 45 307.7

[51] Int. Cl.$^6$ ................................................. H02K 3/14
[52] U.S. Cl. ..................... 310/201; 310/213; 174/33; 174/34
[58] Field of Search .......................... 310/213, 201; 174/33, 34

[56] References Cited

U.S. PATENT DOCUMENTS

| 2,714,975 | 8/1955 | Heidbreder | 310/213 |
| 3,585,428 | 6/1971 | Bennington | 310/213 |
| 3,614,497 | 10/1971 | Brenner | 310/213 |

FOREIGN PATENT DOCUMENTS

| 1144387 | 2/1963 | Germany . |
| 1903090 | 10/1964 | Germany . |
| 2110126 | 10/1971 | Germany . |
| 1488769 | 1/1976 | Germany . |

OTHER PUBLICATIONS

Xu Shanchun, et al. "A New Transposition Technique of Stator Bars of The Hydrogenerator", Proceedings of International Symposium on Salient–Pole Machines With Particular Reference to Large Hydro–Electric Generators and Synchronous Motors, (pp. 384–389), Oct. 1993.

M. Brüderlink, et al. "Herstellung der Wicklungen elektrischer Maschinen", (pp. 69–83), 1973.

*Primary Examiner*—Steven L. Stephan
*Assistant Examiner*—Tran N. Nguyen
*Attorney, Agent, or Firm*—Oblon, Spivak, McClelland, Maier, & Neustadt, P.C.

[57] ABSTRACT

Winding bars of AC machines include a multiplicity of mutually electrically insulated conductor elements, which are transposed according to the Roebel principle. The conductor elements in the two end clip sections and in the active part section are transposed with one another.

In order to achieve virtually perfect field compensation in the winding overhang, the conductor elements in the two end clip sections have a transposition of between 60° and 120°. In the active part section, either an incomplete transposition is provided, i.e. the transposition in the active part section is uniform and less than 360°, or, given a complete 360° transposition in the active part section a void, i.e. a nontransposed section, is provided in the center of the active part, while the transposition in the active part section outside this nontransposed section is a uniform 180° transposition.

4 Claims, 3 Drawing Sheets

TRANSPOSED STATOR WINDING BAR WITH EXTENDED FIELD COMPENSATION

BACKGROUND OF THE INVENTION

1. Field of the Invention

The invention relates to a winding bar, which is short-circuited at the ends, of AC machines with extended field compensation according to the preamble of patent claim 1.

The invention in this case refers to a prior art such as is revealed, for example, in DE-C 14 88 769.

2. Discussion of Background

Stator winding bars of large AC machines regularly comprise a multiplicity of mutually insulated conductor elements which are transposed with one another according to the Roebel principle and are short-circuited at both bar ends (cf. Sequenz "Herstellung der Wicklungen elektrischer Maschinen" [Manufacture of the windings of electric machines], Springer-Verlag Vienna, N.Y., 1973, pages 69–83, in particular FIG. 19 on page 79).

The classic Roebel bar has a 360° transposition in the slot part. In the end clips, the conductor elements are guided in parallel, that is to say with no transposition. However, it was very soon recognized that outside the slot, too, the bars are covered by alternating fields which permeate the end clips from the broad side (transverse components) and from the narrow side (radial components).

In order to avoid undesirable additional losses due to the end field of the stator, the end clips are subdivided into mutually insulated conductor elements. However, losses still arise due to so-called loop currents, which are closed at the bar ends via the connecting sleeve. For this reason, a number of special transpositions have been proposed relating both to the slot or active part of the bar and to its end clip part. In section 3.3 "Roebelstäbe mit erweitertem Feldausgleich" [Roebel bars with extended field compensation] of the aforementioned Sequenz book, G. Neidhöfer gives a virtually complete overview of the various options for achieving the extended field compensation and thus for eliminating relatively large temperature differences and hence local overheating within the bar. A particularly economical solution here is the 90°/360°/90° transposition, that is to say the conductor elements in the two end clips are transposed by 90° in each case and the conductor elements in the active part are transposed by 360° (cf. Sequenz loc. cit. FIG. 24 on page 74, or DE-C 14 88 769).

Since the total length of the machine becomes greater in machines having a short active part length, e.g. hydrogenerators, owing to the transposition in the end clips, and the support of the end clips having large overhangs involves a high degree of outlay, a novel path to extended field compensation is proposed in the conference report ISSM-93 "Proceedings of the International Symposium on Salient-Pole Machines", 10–12 October 1993, WUHAN, China, pages 384–389, in the paper by Xu Shanchun et al. "A New Transposition Technique of Stator Bars of The Hydrogenerator", namely a so-called "incomplete transposition" ("non-360° transposition") or a so-called "transposition with a void" in the active part in combination with nontransposed end clip parts. Each of the two "special transpositions" achieves a marked reduction in the loop currents, and, according to the statements of the conference report, they are supposed to greatly reduce the temperature differences within the bar.

SUMMARY OF THE INVENTION

Accordingly, one object of the invention, based on the outlined prior art, is to provide a novel transposed stator winding bar with extended field compensation which makes it possible to press the loop currents to an even further extent and hence flatten the temperature profile in the conductor bar.

This object is achieved according to the invention by virtue of the fact that the conductor elements in the end clip part have a transposition of between 60° and 120°, and an incomplete transposition is provided in the active part section, i.e. the transposition in the active part section is uniform and less than 360°, or, given a complete 360° transposition in the active part section, a void, i.e. a nontransposed section, is provided in the center of the active part, while the transposition in the active part outside this nontransposed section is a uniform 180° transposition.

The joint application of the partial teachings according to DE-C 14 88 769 (special transposition with 90°/360°/90° transposition) and an incomplete transposition/transposition with a void in the active part according to Xu Shanchun et al. loc. cit. leads to a conductor bar which enables a not readily foreseeable virtually complete suppression of the loop currents, and hence another flattening of the temperature profile in the conductor bar is achieved.

The invention can be employed in all medium-sized and large electric machines, such as turbo generators or hydrogenerators.

BRIEF DESCRIPTION OF THE DRAWINGS

A more complete appreciation of the invention, the considerations underlying it and many of the attendant advantages thereof will be readily obtained as the same becomes better understood by reference to the following detailed description and considered in connection with the accompanying drawings, wherein.

DESCRIPTION OF THE PREFERRED EMBODIMENTS

Figure 1:
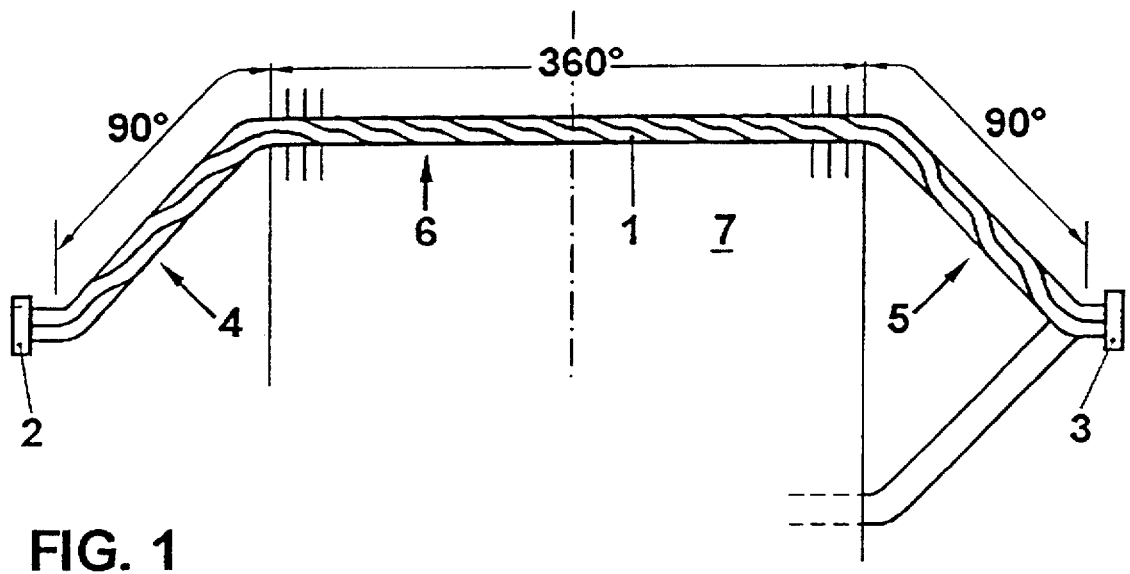
FIG. 1 shows diagrammatic plan view of a known Roebel bar with extended field compensation, having 90°/360°/90° transposition.

Referring now to the drawings, wherein like reference numerals designate identical or corresponding parts throughout the several views, the Roebel bar according to FIG. 1 comprises mutually electrically insulated conductor elements 1, which are electrically and mechanically connected to one another at the ends by means of eyes 2, 3. It comprises two end clip sections 4, 5 in the left-hand and right-hand winding overhangs and an active part section 6. The latter lies completely in slots (not illustrated) in the stator laminated body 7 (active part) of the electric machine. The two end clip parts 4, 5 are transposed by 90° in each case and the active part 6 is transposed by 360°.

Figure 2A:
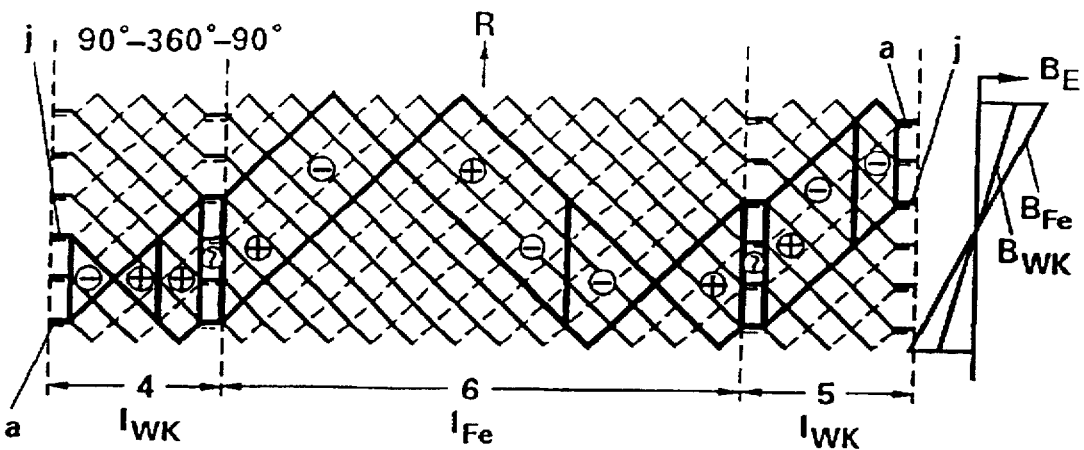
FIG. 2 shows diagrams of Roebel bars with different transpositions for illustrating the effect of the intrinsic field, to be precise for a Roebel bar having the known 90°-360°-90° transposition (FIG. 2a), a Roebel bar having transposition with a void (FIG. 2b) and a Roebel bar having incomplete transposition (FIG. 2c)
Figure 3A:
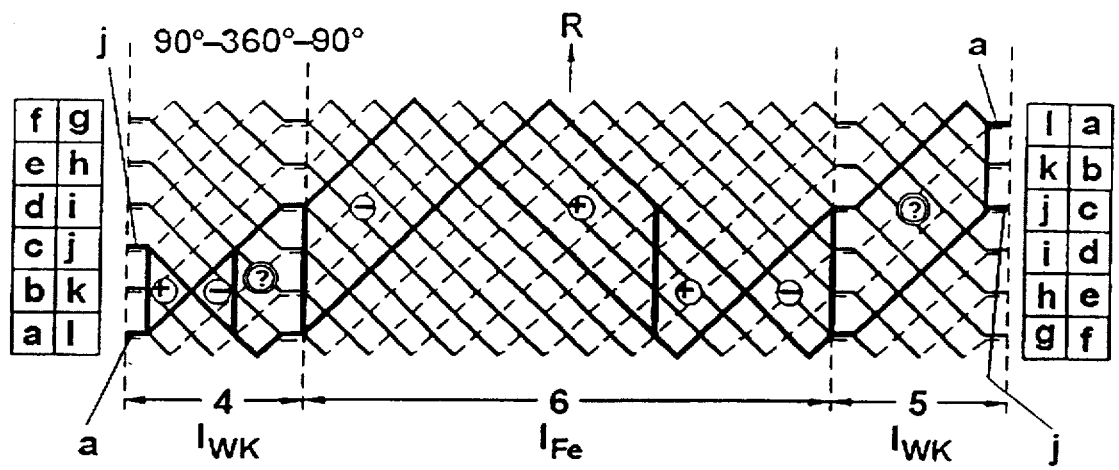
FIG. 3 shows diagrams of Roebel bars having different transpositions illustrating the effect of the external field, to be precise for a Roebel bar having the known 90°-360°-90° transposition (FIG. 3a), a Roebel bar having transposition with a void (FIG. 3b) and a Roebel bar having incomplete transposition (FIG. 3c)

The diagrammatic diagram according to FIG. 2a or 3a for the Roebel bar having 90°/360°/90° transposition according to FIG. 1 shows the course of the, in the case of the example, five conductor elements a to f and g to l per conductor element pillar in the left-hand end clip 4, in the active part 6 and in the right-hand end clip 5. The manner in which the individual conductor elements in the active part 6 in the slot assume each position (=360° transposition), while they are transposed by 90° in the end clips, is clearly evident. The conductor element d in the two end clips 4, 5 taken together is positioned the longest in the direction of the rotor R. The other conductor elements are not positioned as long in the direction of the rotor R. As follows from the known effect of the electromagnetic field on the end clip part of a non-transposed bar, the conductor element d is loaded with the most current, and the remaining conductor element progressively with less. For understanding the invention, it suffices to emphasize that in the case of a 90°-360°-90° transposition, the intrinsic field of the winding overhang is fully compensated, while the external field of the winding overhang is only partially compensated (cf. SEQUENZ loc. cit., in particular page 74, FIG. 24, and the associated text on page 75).

This is where the invention starts. If, on a conductor bar which is transposed by 90° in the end clips 4, 5, the active part section 6 is designed with an incomplete transposition i.e. a transposition with less than 360° transposition, or if a void (=nontransposed section) is provided in the center of the active part with 360° transposition outside the void, then those conductor elements which carry high currents are left longer at the bottom of the slot. They then deliver current to those conductor elements which are closer to the slot opening, that is to say are more adjacent to the rotor R. They, however, are precisely those conductor elements which carry this current. In this way, it is possible to achieve a virtually perfect uniform current distribution in the conductor bar.

Figure 2B:
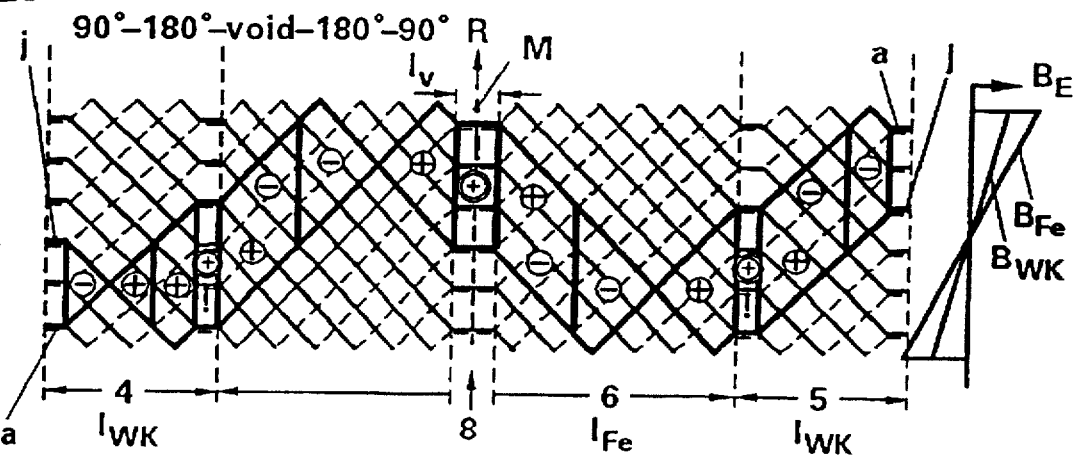
Figure 2C:
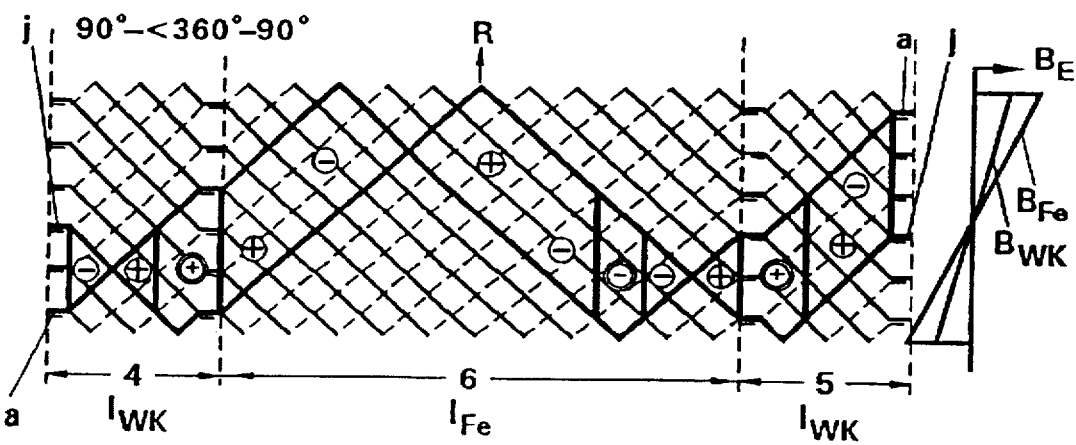
Figure 3B:
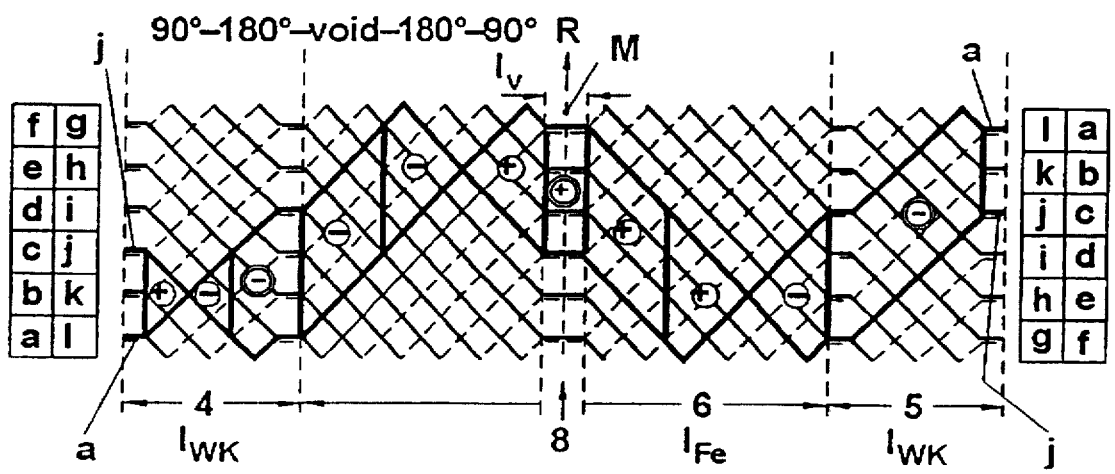
Figure 3C:
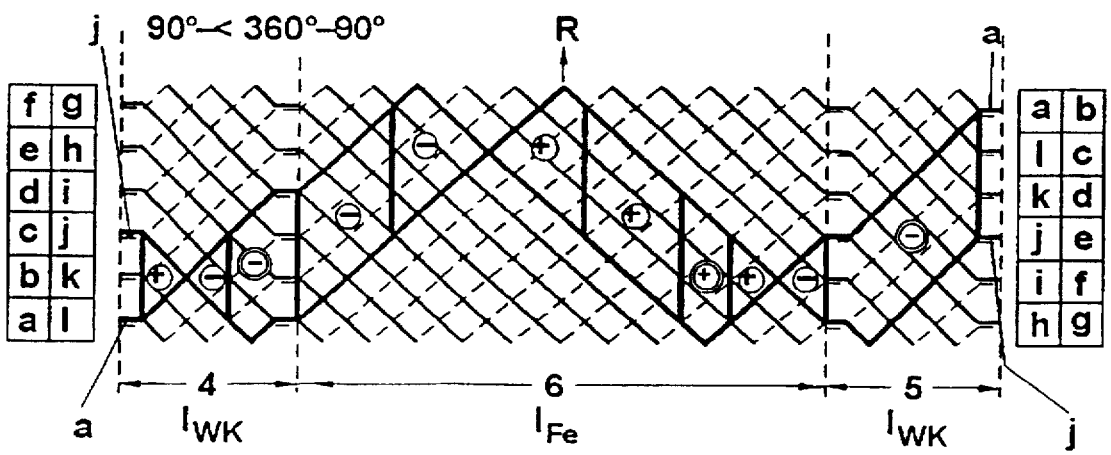

The two variants of transposition with a void and incomplete transposition are diagrammatically illustrated in the two diagrams according to FIGS. 2b and 3b and FIG. 2c and FIG. 3c, respectively, in comparison with the known Roebel bar having 90°-360°-90° transposition according to FIG. 2a and 3a. FIGS. 2a, 2b and 2c relating to the consideration of the intrinsic field, and FIGS. 3a, 3b and 3c relating to the consideration of the external field. In this case, the illustration follows the manner of illustrating Roebel bars which is customary in the literature, as was also used, for example, in DE-C 14 88 769 (mentioned in the introduction). Thus, the solid lines running from top left to bottom right symbolize conductor element tracks which, in a side view of a two-plane bar (FIG. 1), are situated on the front side of the latter; interrupted lines show the tracks on the rear side, that is to say in the second conductor element plane. Furthermore, FIGS. 2a to 2c illustrate the respective field profile $B_E$ of the intrinsic field $B_{Fe}$ in the active part and of the intrinsic field $B_{WK}$ in the winding overhang against the bar height. The minus and plus signs in a circle in this case denote the sign of the voltages induced in the partial areas of the elementary loops, taking account of the sense of rotation of the area contours and the direction of the flux permeating them. The areas designated by a question mark in a circle in FIGS. 2a and 3a symbolize the noncompensated part at the nontransposed transition from the active part 6 to the end clips 4 and 5. FIGS. 3a to 3c furthermore illustrate the position of the, in the case of the example, 12 conductor elements a to l at the bar ends.

Before the invention is described in more detail, let the following field considerations be made first:

As is evident in the case of the bar having 90°-360°-90° transposition according to FIG. 3a, a loop part which is not compensated (question mark in a double circle) remains in the consideration of the external field. This noncompensated part generates loop currents which are distributed with a sinh shape (antisymmetrically) over the bar height. The aim of the transposition with a void/incomplete transposition in the active part is to compensate this remainder. As will be explained in more detail below, this compensation succeeds by now producing a noncompensated part—symbolized by a plus sign in a double circle—in the active part 6, which non-compensating part counteracts that in the end clip part 4 and 5—symbolized by a minus sign in a double circle. In this respect, it must be noted that this mechanism functions only when the field of the winding overhang at the location of the bar and the slot field in the active part are approximately in phase. This is the case since, as known, the current is displaced in the same direction (radially inwards) in the active part as well as in the end clip part, which must be attributed to in-phase fields but the relatively large noncompensated loop parts in the winding overhang can be compensated by relatively small counter-loops in the active part, since the slot transverse field is significantly stronger.

In the consideration of the intrinsic field according to FIGS. 2a to c, it can be seen that the loops are fully compensated in the case of a bar having 90°-360°-90° transposition. Only possibly nontransposed bar parts, for example at the active part exit, produce residual voltages for loop currents. A transposition with a void 8 in the active part 6 now generates loop voltages which result in loop currents which are distributed with a cosh shape (symmetrically) with regard to the bar height. The effect of possibly non-transposed bar parts of the winding overhang directly at the active part exit would be intensified. In contrast to this, incomplete transposition in the active part has the opposite effect. The noncompensated parts in the winding overhang counter the noncompensating part in the active part and cancel one another out, this compensation possibly not being 100% effective since the incomplete transposition in the active part is geared to the compensation of the external field of the winding overhang. The impression may be given, then, that the invention achieves an improvement at one location (external field) and a deterioration at the other location (intrinsic field). This is indeed the case. However, if both results are considered together, then the result seen overall is an improvement, particularly in the case of incomplete transposition.

The conductor bar according to FIG. 2b and FIG. 3b has a void 8 in the center M of the active part, that is to say a section in which the conductor elements a to l are guided in parallel. Outside this region 8, to the left and right of the void, the transposition is 180° in each case. The axial length $l_v$ of this void 8 depends to a first approximation on the size of the winding overhang $l^{WK}$. Using modern computing methods, it is possible, for a specific machine, to determine this void comparatively exactly, but it is possible to specify as a guide value that the size $l^v$ of the void 8 should be between 5 and 10%, at most 15%, of the overhang $l^{WK}$, in order to achieve virtually complete (extended) field compensation in the winding overhang. As a second guide value for dimensioning the void 8 in the case of turbo generators, it is possible to specify that it can amount to up to 10% of the active part length $l_{Fe}$.

Figure 4:
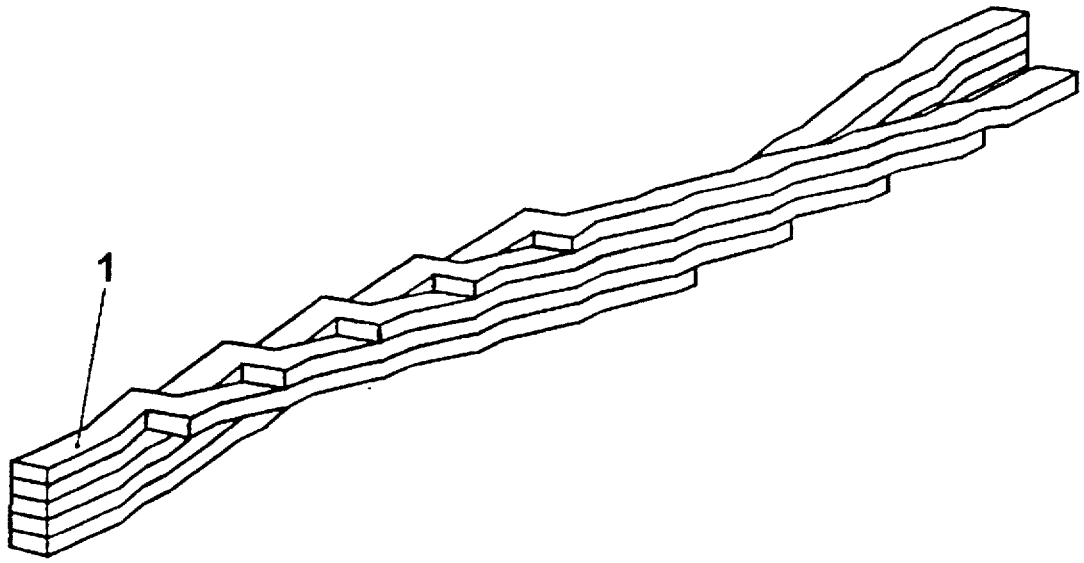
FIG. 4 shows a diagrammatic illustration of half of a bar having incomplete transposition with five conductor elements per pillar having 324° transposition.

The conductor bar according to FIG. 2c and FIG. 3c has an incomplete transposition in the active part 6, that is to say a transposition less than the customary 360° transposition. In the case of the conductor bar illustrated in FIG. 4 having in each case 5 conductor elements 1 per pillar, in other words a total of 10 conductor elements, the transposition is 9/10 of 360°, that is to say 324°, and the incomplete transposition is accordingly 360°, this simultaneously representing the minimum incomplete transposition for such a bar.

Real Roebel bars have a much higher number of conductor elements. This number is typically between 80 and 120 conductor elements per bar. Consequently, for a bar having n conductor elements and 360° transposition in the active part, this gives a minimum incomplete transposition of U=360°/n of the order of 4.5° in the case of 80 conductor elements and 3° in the case of 120 conductor elements per conductor bar.

Analogously to the dimensioning of the void, the degree of incomplete transposition also depends to a first approximation on the winding overhang. The larger the overhang is, the greater, too, the influence of the end field in the winding overhang becomes and, accordingly, the degree of incomplete transposition in the active part should also be higher. As in the dimensioning of the void, the degree of incomplete transposition can in this case, too, be determined comparatively exactly for a specific machine using modern computing methods, but as a guide value it is possible to specify that, in angular degrees, it should be approximately 10° to 15° in order to achieve virtually complete (extended) field compensation in the winding overhang.

A transposition of 90° in the end clips was always assumed in the above explanations. Extensive calculations have shown that even with deviations of 30°, that is to say transpositions of 60° to 120° in the end clip sections 4, 5, in combination with transpositions with a void or incomplete transposition in the active part 6, virtually perfect field compensation can be achieved in the winding overhang.

In principle, it is possible to produce bars which have incomplete transposition as well as transposition with a void given the specified transposition in the end clip section. However, the production of such conductor bars is complicated, but may perfectly well be taken into consideration for special cases.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A winding bar for an AC machine with extended field compensation, comprising a plurality of mutually electrically insulated conductor elements which are transposed according to a Roebel principal, the conductor elements forming two end clip sections and an active part section between the two end clip sections, the conductor elements in the two end clip sections having a transposition of between 60°, and 120° and the conductor elements in the active part section having an incomplete transposition which is uniform and less than 360°.

2. The winding bar as claimed in claim 1, wherein, the incomplete transposition measured in angular degrees is 10° to 15°.

3. A winding bar for an AC machine with extended field compensation, comprising a plurality of mutually electrically insulated conductor elements which are transposed according to a Roebel principal, the conductor elements forming two end clip sections and an active part section between the two end clip sections, the conductor elements in the two end clip sections having a transposition of between 60° and 120° and the conductor elements in the active part section having a void provided in a center of the active part section with a transposition in the active part section on both sides of the void of a uniform 180° transposition, so that the active part section has a complete 360° transposition.

4. The winding bar as claimed in claim 3, wherein the void has a length of the order of magnitude of about 10% of the winding overhang.

* * * * *